Figure 1:
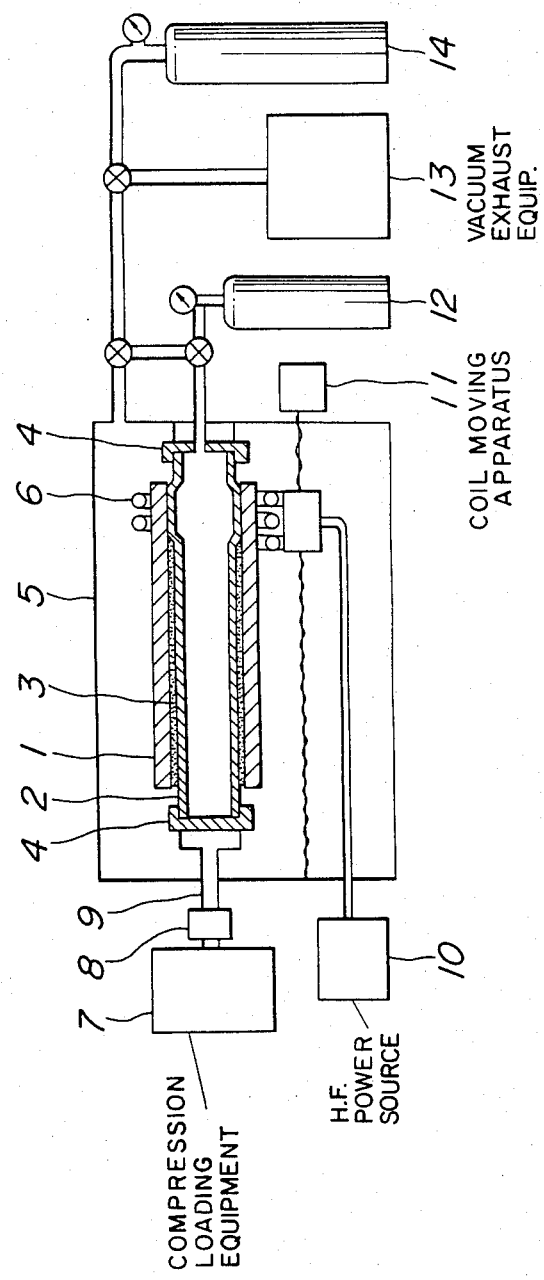

United States Patent [19]

Kawasaki et al.

[11] Patent Number: 4,533,806

[45] Date of Patent: Aug. 6, 1985

[54] METHOD OF MANUFACTURING BIMETALLIC TUBES

[75] Inventors: Tatsuo Kawasaki; Isao Takada, both of Chiba; Hiroshi Ohtsubo, Ichikawa, all of Japan

[73] Assignee: Kawasaki Steel Corporation, Kobe, Japan

[21] Appl. No.: 383,733

[22] Filed: Jun. 1, 1982

[30] Foreign Application Priority Data

Jun. 11, 1981 [JP] Japan .................................. 56-88797
Dec. 25, 1981 [JP] Japan ................................ 56-209046

[51] Int. Cl.³ .......................... H05B 5/00; H05B 6/00
[52] U.S. Cl. .................................... 219/8.5; 219/9.5; 228/131; 228/132; 228/243
[58] Field of Search .................... 228/131, 132, 173 A, 228/224, 243, 265; 219/8.5, 9.5, 85 H, 85 M

[56] References Cited

U.S. PATENT DOCUMENTS

| | | | |
|---|---|---|---|
| 1,242,589 | 10/1917 | Preschlin | 228/132 |
| 2,371,348 | 3/1945 | Murray | 228/132 |
| 3,025,596 | 3/1962 | Ward et al. | 228/131 |
| 3,397,445 | 8/1968 | Ulmer et al. | 228/132 |
| 3,408,728 | 11/1968 | Fickett et al. | 228/243 |
| 4,049,184 | 9/1977 | Rozengart et al. | 228/243 |

FOREIGN PATENT DOCUMENTS

| | | | |
|---|---|---|---|
| 51-94459 | 8/1976 | Japan | 228/132 |
| 413002 | 10/1974 | U.S.S.R. | 219/85 M |

Primary Examiner—Roy N. Envall, Jr.
Assistant Examiner—M. M. Lateef
Attorney, Agent, or Firm—Balogh, Osann, Kramer, Dvorak, Genova & Traub

[57] ABSTRACT

A method of manufacturing bimetallic tubes is disclosed. In this method, after an inner tube is inserted into an outer tube, the resulting tube assembly is heated, while pressurizing the inside of the inner tube with a gas, in the presence or absence of a solder material. When using no solder material, the materials of the inner and outer tubes are so selected that a thermal expansion coefficient of the inner tube is smaller than that of the outer tube.

6 Claims, 2 Drawing Figures

METHOD OF MANUFACTURING BIMETALLIC TUBES

This invention relates to a method of manufacturing clad tubes or bimetallic tubes, and more particularly to a method of manufacturing as bimetallic tubes by fitting an inner tube having a corrosion resistance or heat resistance to an inside of a cheap outer tube.

In general, tubes required to have various properties in accordance with their applications so that they are manufactured from materials satisfying the above properties. Lately, properties required for the tube become diverse and severe with the advancement of industries, particularly chemical industry and its surrounding or correlated technics, so that it is actually obliged to use a very expensive material in order to satisfy all of the required properties with mono-material.

On the other hand, in order to suppress an increase of cost due to the use of the above expensive material, there are proposed various methods of manufacturing multi-layer tubes by combining materials having different properties, which can be broadly divided into the following groups:

(i) Two tubes having slightly different diameters are mechanically fitted to each other by utilizing thermal expansion and shrinkage or by using a solid lubricant such as Pb, Zn or the like;

(ii) A tube having a small diameter is inserted into a tube having a large diameter and joined to each other by any one of explosive welding, hot rolling and cold rolling;

(iii) A steel band is wound around an outer surface of a tube and welded at its end thereto;

(iv) To an inner or outer surface of a tube is clad a welding rod of a different material by welding or the tube clad with different material is subjected to a hot or cold rolling to produce a long tube; and (v) Several steel bands are superimposed one upon the other and shaped into a tube, or they are helically wound and welded.

However, the above mentioned methods have drawbacks as mentioned below and have not always satisfactory properties as a multi-layer tube.

According to the method (i), the resulting bimetallic tube is loosened at its joint part in use at high temperature or in repetitive use at high and low temperatures, or the fitting through lubrication of Pb, Zn or the like is difficult for the combination of tubes having a thinner thickness or the manufacture of large size bimetallic tubes. That is, this method has a restriction on the size of the tube to be manufactured.

In the method (ii), the manufacture of large size bimetallic tubes is possible, but the manufacture of small size bimetallic tubes is difficult. Particularly, the explosive welding has trouble in the diameter and length of the tube as well as the productivity, while the hot or cold rolling makes the manufacturing step complicated.

In the method (iii), the joint between the inner and outer tubes is good in the welded portion, but the inner tube is not joined to the outer tube at the portion other than the welded portion, so that there is a fear of causing the loosening of the joint part or the cracking of the welded portion in use at high temperature or in repetitive use at high and low temperature. Furthermore, it is necessary to select materials which do not crack during the welding, so that there is a restriction on the selection of materials to be combined.

In the method (iv), the overlay welding can be applied only to large size bimetallic tubes so that there is a restriction on the size of the tube to be manufactured. Furthermore, the cracking may be produced on the deposit or base metal by overlay welding and also the workability of the welded part is poor, so that there is a restriction on the combination of the cladding material and the base metal tube.

According to the method (v), the manufacture of small size bimetallic tubes is difficult, and also the resulting bimetallic tube is loosened at portions other than welded portion in use at high temperature. Furthermore, it is difficult to weld tubes having extremely different wall thicknesses or consisting of extremely different materials to each other even in case of manufacturing large size bimetallic tubes, so that restrictions on the size and material of tubes to be combined is unavoidable.

It is, therefore, an object of the invention to eliminate the above mentioned drawbacks of the prior art and to provide an improved method of manufacturing bimetallic tubes.

According to a first aspect of the invention, there is provided in a method of manufacturing bimetallic tubes by inserting an inner tube into an outer tube and joining them with each other, the improvement wherein after the insertion of the inner tube into the outer tube, a solder material is filled in a space defined between the inside of the outer tube and the outside of the inner tube, and the resulting tube assembly is brazed at its overlapped part by zone-heating the overlapped part while pressurizing the inside of the inner tube with a gas and moving said part to be heated over a whole length of the tube assembly.

According to a second aspect of the invention, there is provided in a method of manufacturing bimetallic tubes by inserting an inner tube into a outer tube and joining them with each other, the improvement wherein materials of the inner and outer tubes are so selected that a thermal expansion coefficient of the inner tube is smaller than that of the outer tube, and after the insertion of said inner tube into said outer tube, the resulting tube assembly is heated while pressurizing the inside of the inner tube with a gas and cooled to fasten said inner tube to the outer tube.

The invention will now be described in greater detail below.

In the first aspect of the invention, all of tube materials capable of performing usual brazing treatment can be used. Furthermore, it is advantageous that at least one joint area of the inner and outer tubes is subjected to a metal plating or spraying with at least one of solder materials selected from Ni, Cr, Cu and Fe. After the space defined between the inside of the outer tube and the outside of the inner tube is filled with the solder material, the space may be maintained under a reduced pressure or in an atmosphere of an inert gas and/or a reducing gas, if necessary. In the zone-heating, a compressive force may be applied to the inner tube from both ends thereof toward its axial direction while pressurizing the inside of the inner tube with air or an inert gas, whereby the inner and outer tubes can easily be brazed to each other.

According to the first aspect of the invention, it is advantageous to select the solder mateial adaptable for the combination of tube materials, which are selected in accordance with the use circumstances of bimetallic tube, and the use temperature of bimetallic tube. As the solder material, use may be made of ones shown in the following Table 1 in compliance with the materials of inner and outer tubes and the use temperature.

TABLE I

| Kind | Shape | Ingredient (%) | Melting temperature range (°C.) | Application and Summary |
|---|---|---|---|---|
| Phosphorous containing copper solder | Cast or hot rolled rod and band or powder | P: 5–7<br>Ag: 5–15<br>Cu: balance | 640–900 | no flux for copper. use in brazing of copper and copper alloy. unsuitable for steel and cast iron. torch, immersion, furnace brazing. |
| Silver solder | Band, wire and powder | Cd: 0–24<br>Cu: 15–35<br>Zn: 0–28<br>Others: 0–5<br>Ag: balance | 600–790 | suitable for brazing of copper alloy, nickel alloy and iron alloy. the presence of phosphorous is unsuitable for brazing of copper, cast iron and other iron alloy. torch, immersion, furnace brazing. |
| German silver solder | Powder and lump | Zn: 30–55<br>Ni: 0–10<br>Cu: balance | 800–900 | suitable for brazing of copper alloy, nickel alloy, copper and cast iron. torch, immersion, furnace brazing. |
| Brass solder | Band, rod, wire, powder and lump | Zn: 0–48<br>Others: 0–11<br>Cu: balance | 850–980 | suitable for brazing of copper alloy, nickel alloy, cast iron and steel joint requiring a proper strength. |
| Gold solder | Band and wire | Cu: 20–63<br>Au: balance | 880–960 | use in brazing of electron tube part. reducing atmosphere, reduced pressure, vacuum brazing |
| Aluminum solder | Band, rod and wire | Si: 5–12<br>Cu: 0–4<br>Al: balance | 520–640 | use in aluminum alloy torch, immersion, furnace brazing. necessity of flux |
| Heat resistant solder | Band, rod, wire and powder | Ni: 70<br>Cr: 17<br>B: 3.5<br>Fe + Si + C: 10 | 1000–1070 | suitable for stainless steel and high nickel alloy. reducing atmosphere, hydrogen furnace brazing |
| | | Ag: 85<br>Mn: 15 | 960–970 | |

In the brazing, the use of flux is favorable in order to prevent mainly the oxidation and a decrease in flowability of the solder material. For this purpose, zinc chloride, resin, borax, boric acid, sodium chloride, lithium cloride, fluorine compounds and the like are selectively used as the flux in accordance with the kind of the solder and tube materials to be joined.

In the zone-heating of the tube assembly, the heating temperature is within a working temperature range of the solder material selected as described above. Further, a pressure P(Kg/cm²) applied to the inside of the inner tube is just enough to expand the inner tube due to its elastic or plastic deformation so as to closely contact with the inner surface of the outer tube. This pressure somewhat varies in accordance with the space between the inner tube and the outer tube, and is advantageous to be given by the following equation:

$$2\sigma_i t_i / D_i P / 100 < 2 \sigma_o t_o / D_o,$$

wherein $\sigma_i$ is a yield stress or proof stress (Kg/mm²) of the inner tube material at the working temperature, $t_i$ is a thickness (mm) of the inner tube, $D_i$ is an outer diameter (mm) of the inner tube, $\sigma_o$ is a fracture stress (Kg/mm$_2$) of the outer tube material at the brazing temperature, $t_o$ is a thickness (mm) of the outer tube and $D_o$ is an inner diameter (mm) of the outer tube.

According to the second aspect of the invention, the pipe assembly may be heated over its whole length at once or the local heating zone may be moved over the whole length of the tube assembly. In the latter case, the enlargement of the tube can be further facilitated by applying a compressive force to the inner tube toward the axial direction thereof.

According to the invention, the size of the resulting bimetallic tube can be regulated by enlarging or reducing the diameter of the bimetallic tube in the conventional manner.

Figure 2:
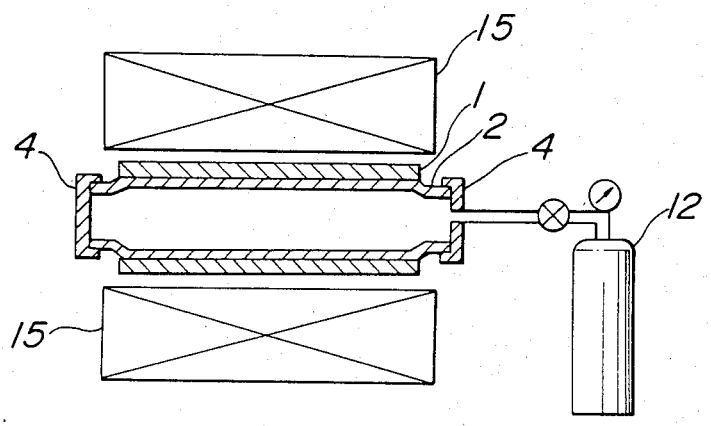

The invention will be described with reference to the accompanying drawings, wherein:

FIGS. 1 and 2 are schematically longitudinal section views of embodiments of the apparatus used for performing the method according to the invention, respectively.

Referring to FIG. 1, an inner tube 2 is inserted into an outer tube 1 and then a solder powder 3 is filled in a space defined between the outer tube 1 and the inner tube 2 together with a flux, if necessary. After both ends of the inner tube 2 are airtightly sealed with a seal cap 4, the resulting tube assembly is placed in an atmosphere-conditioning chamber 5. If necessary, the space and the inside of the inner tube 2 may be vacuumized by means of a vacuum exhaust equipment 13 or an inert or reducing gas may be introduced from an atmosphere regulating bomb 14 into the inside of the chamber 5. Then, an air or inert gas is pumped form a gas bomb 12 into the inside of the inner tube 2 under pressure, while the tube assembly is zone-heated by applying a voltage from a high frequency power source 10 to a high frequency heating coil 6 and moving the coil 6 by means of a coil moving apparatus 11, whereby the inner tube 2 is expanded outwardly at each position of the heating coil 6 to be moved and brazed to the outer tube 1. By moving such a heating position over the whole length of the tube, the inner tube can be brazed to the outer tube to manufacture a bimetallic tube. Moreover, the brazing between the inner and outer tubes can be promoted by applying a compressive force to both ends of the inner tube 2 toward the axial direction thereof through a compressive loading equipment 7, a load measuring instrument 8 and a compression piston 9 during the zone-heating.

Further, if it is intended to manufacture a bimetallic tube without using a solder material, there are used inner and outer tubes having different thermal expansion coefficients. When such inner and outer tubes are applied to the apparatus shown in FIG. 1, the inner tube 2 is expanded and joined to the outer tube 1 during the zone-heating. Then, by cooling the tube assembly after the heating, the inner tube is strongly joined to the outer tube owing to the difference in thermal expansion coefficient between the inner and outer tubes to manufacture a bimetallic tube.

FIG. 2 shows another embodiment of manufacturing bimetallic tubes, wherein an inner tube 2 is inserted into an outer tube 1 and both ends of the inner tube 2 are airtightly sealed with seal caps 4 and then the resulting tube assembly is housed in a tubular electric furnace 15. When air or inert gas is pumped from a gas bomb 12 into the inside of the inner tube 2 while heating the whole of the tube assembly in the furnace 15, the inner tube 2 is expanded and joined to the outer tube. When the tube assembly is cooled after the heating, the shrinkage of the outer tube 1 is larger than that of the inner tube 2 on the basis of the difference in thermal expansion coefficient, so that the outer tube 1 further compresses the inner tube 2, whereby the outer and inner tubes are strongly joined to each other.

The following examples are given as an illustration of the invention and are not intended as limitations thereof.

EXAMPLE 1

In this example, there were used SUS 304 TP having an outer diameter of 17.3 mm and a thickness of 1.2 mm as an outer tube, and an Inconel welded tube having an outer diameter of 14.0 mm and a thickness of 0.3 mm as an inner tube. As a solder material, there was a heat resistant solder of BNi-4 powder (Ni-Si-B series) and a flux was not used.

At first, a paste of the powdery solder in an organic solvent was applied to the outer surface of the inner tube, which was inserted into the outer tube. Each end of the inner tube was brazed with a SUS 304 seal cap. The resulting tube assembly was placed in an atmosphere-conditioning chamber shown in FIG. 1, which was exhausted and maintained in an atmosphere of Ar—5% $H_2$. The inside of the inner tube was vacuumized and pressurized with argon gas up to 10 Kg/cm$^2$. The tube assembly was zone-heated up to 1150° C. by a high frequency heating coil of double turns and the heating zone was moved at a rate of 200 mm/min. The thus obtained bimetallic tube was confirmed to be completely brazed as a result of longitudinal section inspection.

EXAMPLE 2

There were used a SUS 304 TP having an outer diameter of 17.3 mm and a thickness of 1.2 mm as an outer tube, and a cupronickel seam welded tube having an outer diameter of 14.0 mm and a thickness of 0.5 mm as an inner tube. As a solder material, there was a silver solder of BAg-8 powder, which was mixed with a commercially available flux and applied to the outer surface of the inner tube.

Then, the same procedure as described in Example 1 was repeated except that the inside of the chamber was under a vacuum ($10^{-3}$ Torr) the inside of the inner tube was pressurized with Ar gas to 50 Kg/cm$^2$, the zone-heating temperature was 850° C. and the moving rate was 200 mm/min. The thus obtained double tube was confirmed to be completely brazed as a result of longitudinal section inspection.

EXAMPLE 3

There were used a SUS 304 TP having an outer diameter of 17.3 mm and a thickness of 1.2 mm as an outer tube, and a copper tube having an outer diameter of 14.0 mm and a thickness of 0.5 mm as an inner tube. As a solder material, there was used a Solder 50 of Sn powder, which was mixed with a commercially available flux for steel and applied to the outer surface of the inner tube.

Then, the same procedure as described in Example 1 was repeated except that the inside of the chamber was maintained in air atmosphere, the inside of the inner tube was pressurized with air 50 kg/cm$^2$, the zone-heating temperature was 300° C. and the moving rate was 200 mm/min. Further, a compressive force of about 100 kg was applied to both ends of the inner tube toward the axial direction thereof. The thus obtained bimetallic tube was confirmed to be completely brazed as a result of longitudinal section inspection.

EXAMPLE 4

There were used a SUS 304 TP having an outer diameter of 17.3 mm and a thickness of 1.2 mm as an outer tube, and an Inconel welded tube having an outer diameter of 14.0 mm and a thickness of 0.3 mm as an inner tube. After the joint surfaces of these tubes, i.e. the inner surface of the outer tube and the outer surface of the inner tube were subjected to Cu plating, a silver solder of BAg-8 powder together with a flux was applied to the outer surface of the inner tube.

Then, the same procedure as described in Example 1 was repeated except that the inside of the chamber was purged with argon gas, the inside of the inner tube was pressurized with argon gas to 50 kg/cm$^2$, the zone-heating temperature was 850° C. and the moving rate was 200 mm/min. The thus obtained bimetallic tube was confirmed to be completely brazed as a result of longitudinal section inspection.

EXAMPLE 5

The same procedure as described in Example 1 was repeated except that the pressure inside the inner tube was 30 kg/cm$^2$. In the thus obtained bimetallic tube, the outer diameter of tube was enlarged to 18.0–18.5 mm. And then this bimetallic tube is reduced in diameter to 17.5 mm in conventional way. As a result of longitudinal section inspection, the inner and outer tubes were completely brazed to each other.

As apparent from the above examples, according to the invention, the combination of inner and outer tubes materials is optional and the solder material may properly be selected in accordance with such a combination. Furthermore, in order to facilitate the brazing, it is effective that the joint surface of the tube is subjected to a metal plating or a metal spraying having the same effect as the metal plating, or a compressive force is applied to both ends of the inner tube toward the axial direction thereof. Moreover, it is a matter of course that the pressure applied to the inside of the inner tube must be changed in accordance with the elastic or plastic deformation quantity of the inner tube material at the heating temperature during the brazing because the manufacture of bimetallic tube utilizes the elastic or plastic deformation of the inner tube at high temperature. However, when the pressure inside the inner tube is larger than that corresponding to the yield stress or proof stress of the outer tube at this high temperature, it results in the enlargement of the outer tube as shown in Example 5. Therefore, it is desirable that the pressure applied to the inside of the inner tube is not more than a pressure corresponding to the breaking stress of the outer tube at the brazing temperature. That is, the pressure inside the inner tube is preferably a value calculated from the aforementioned equation.

Although the above examples have been described with respect to only small size tubes having a diameter of 17.3 mm, the invention can be applied to the manufacture of larger size tubes such as oil well tubes and the like. Further, the invention is applicable to the manufacture of multi-layer box containers and the like.

EXAMPLE 6

In this example, there were used a carbon steel tube (STBA 22) having an outer diameter of 50.8 mm and a thickness of 5.0 mm as an outer tube, and a TIG welding tube of pure titanim (JIS second class) having an outer diameter of 38.0 mm and a thickness of 0.5 mm as an inner tube.

A bimetallic tube was manufactured from such inner and outer tubes as follows. That is, as shown in FIG. 2, the inner tube 2 was inserted into the outer tube 1 and both ends of the inner tube 2 were sealed with seal caps 4 by TIG welding. The resulting tube assembly was housed in the tubular electric furnace 15, at where the whole of the assembly was heated at a heating temperature of 800° C., during which the inside of the inner tube 2 was pressurized with argon gas fed from the gas bomb 12 to 15 atmospheric pressure. After the tube assembly was maintained at 800° C. for 5 minutes, it was taken out from the furnace and cooled under a reduced pressure. The thus obtained bimetallic tube was confirmed to be completely joined as a result of cross sectional inspection through whole length.

EXAMPLE 7

There was used a carbon steel pipe (STBA 22) having an outer diameter of 50.8 mm and a thickness of 5.0 mm as an outer tube, and a TIG welding tube of high purity ferritic stainless steel (Fe-30%Cr-2%Mo) having an outer diameter of 38.0 mm and a thickness of 0.45 mm as an inner tube.

A bimetallic tube was manufactured from such inner and outer tubes as follows. That is, as shown in FIG. 1, seal caps 4 were welded to both ends of the inner tube 2, which was inserted into the outer tube 1. The resulting tube assembly was placed in the atmosphere-conditioning chamber 5, an inside of which was exhausted by means of the vacuum exhaust equipment 13 and filled with argon gas fed from the atmosphere regulating bomb 14. The inside of the inner tube 2 was pressurized with argon gas from the gas bomb 12 to 10 atmospheric pressure. Thereafter, the tube assembly was heated at 1050° C. by moving the zone-heating coil 6 at a rate of 200 mm/min over the whole length of the tube. The thus obtained bimetallic tube was confirmed to be completely joined as a result of cross sectional inspection through whole length.

EXAMPLE 8

There were used a stainless steel tube SUS 316 having an outer diameter of 50.8 mm and a thickness of 5.0 mm as an outer tube, and a TIG welding tube of Ni-base alloy (Inconel 625) having an outer diameter of 38.0 mm and a thickness of 0.5 mm as an inner tube.

The same procedure as described in Example 7 was repeated except that the heating temperature was 1000° C., the pressure inside the inner tube was 30 atmospheric pressure and further a compressive force of about 100 kg was applied to the inner pipe toward the axial direction thereof through the compression loading equipment 7, load measuring instrument 8 and compression piston 9. The thus obtained bimetallic tube was confirmed to be completely joined as a result of cross sectional inspection through whole length.

EXAMPLE 9

The outer diameter of the bimetallic tube obtained in Example 8 was enlarged to 52.8 mm by a hydraulic enlargement process. On the other hand, the outer diameter of the bimetallic tube obtained in Example 6 was reduced to 49.0 mm by a cold drawing process. Each of these enlarged and reduced double tubes was confirmed to be completely joined as a result of cross sectional inspection through whole length.

COMPARATIVE EXAMPLE 1

The same procedure as described in Example 7 was repeated except that a carbon steel tube (STBA 22) having an outer diameter of 50.8 mm and a thickness of 5.0 mm was used as an outer tube, a TIG welding tube of stainless steel SUS 304 having an outer diameter of 38.0 mm and a thickness of 0.5 mm was used as an inner tube, the heating temperature was 1100° C. and the pressure inside the inner tube was 15 atmospheric pressure.

As a result of cross sectional inspection, the resulting bimetallic tube had a gap of about 0.1 mm and also the inner and outer tubes were not closely joined to each other.

The combination of tube materials, relation of thermal expansion coefficient and results of joined state in Examples 6-8 and Comparative Example 1 are shown in the following Table 2.

TABLE 2

| | Relation of thermal expansion coefficient | | Joined State |
|---|---|---|---|
| | Outer tube | Inner tube | |
| Example 6 | Carbon steel | Ti | good |
| Example 7 | Carbon steel | High purity ferritic stainless steel (Fe—30Cr—2Mo) | good |
| Example 8 | Stainless steel (SUS 316) | Ni—base alloy (Inconel 625) | good |
| Comparative | Carbon steel | Stainless steel | bad |

TABLE 2-continued

| | Relation of thermal expansion coefficient | | Joined State |
|---|---|---|---|
| | Outer tube | Inner tube | |
| example 1 | | (SUS 304) | |

It can be seen from Table 2 that the combination of inner and outer tube materials according to the invention may be optional when the thermal expansion coefficient of the outer tube is larger than that of the inner tube. The heating temperature, pressure inside the inner tube, compressive force and the like are factors for enlarging the inner tube at high temperature to closely contact with the outer tube, so that they can easily be determined by considering the strength at the heating temperature, diameter and thickness of the inner tube and the like.

According to the invention, the inner tube is compressed with the outer tube by utilizing the difference in thermal expansion coefficient between the inner and outer tubes, so that both the tube materials are, of course, necessary to be durable at a higher heating temperature. In the practice of the invention, however, the acceptable temperature range is wider than that of the conventional shrink fitting process, so that the maintenance of production step becomes easier. Furthermore, the inner tube is closely joined to the outer tube by applying a pressure to the inside of the inner tube, so that the size in the inner diameter of the outer tube and the outer diameter of the inner tube is not required with a high accuracy as compared with the conventional shrink fitting process, which is considerably advantageous in the manufacture of long-size bimetallic tube. Although the above examples have been described with respect to tubes having a diameter of about 50 mm, the invention is applicable for the manufacture of bimetallic tube having various diameters other than large and small tubes for special applications. Moreover, the upper limit of the use temperature as a bimetallic tube can be raised by increasing the temperature of the inner tube in the pressurizing enlargement.

As mentioned above, the method of manufacturing bimetallic tubes according to the invention is optimum for joining an inner tube of a high corrosion-resistant or heat-resistant expensive material to an outer tube of a cheap material in the presence or absence of a solder material, so that relatively cheap bimetallic tubes can advantageously be manufactured. Furthermore, the resulting bimetallic tubes are applicable for apparatuses and tubes, which have hitherto been obliged to use tubes of expensive, high corrosion-resistant materials, so that they have contributed to reduction of the cost.

What is claimed is:

1. In a method of manufacturing bimetallic tubes by inserting an inner tube into an outer tube, filling a solder material in a space defined between the inside of said outer tube and the outside of said inner tube, and zone-heating the resulting tube assembly by applying heat from a heating unit to each part of the tube assembly, while pressurizing the inside of said inner tube with a gas, so as to effect brazing of said inner tube to said outer tube, the improvement which comprises placing a flux with said solder material in the space between the inside of said outer tube and the outside of said inner tube, while the zone-heating and pressurizing of said tube assembly takes place moving the heating unit over the whole length of said tube assembly so as to expand both the tubes and cause the flux to successively melt and move out of the space between the tubes, effecting brazing of said inner tube to said outer tube.

2. The method as claimed in claim 1, wherein said solder material is previously mixed with a flux.

3. The method as claimed in claim 1, wherein after the filling of the solder material and the flux, the space is maintained under a reduced pressure.

4. The method as claimed in claim 1, wherein at least one joint surface of said inner and outer tubes is subjected to a metal plating or metal spraying with at least one of solder materials selected from the group consisting of Ni, Cr, Cu and Fe.

5. The method as claimed in claim 1, wherein a compressive force is applied to both ends of said inner tube toward the axial direction thereof during the heating of said tube assembly.

6. The method as claimed in claim 1, wherein, after the filling of said solder material and said flux, said space is maintained in an inert or reducing gas atmosphere.

* * * * *